United States Patent [19]
Ford

[11] 3,748,904
[45] July 31, 1973

[54] SEMICONDUCTOR ELECTROMAGNETIC RADIATION ISOLATED THERMOCOUPLE

[75] Inventor: Richard T. Ford, Hampton, N.H.

[73] Assignee: The United States of America as represented by the Secretary of the Navy

[22] Filed: May 28, 1971

[21] Appl. No.: 148,207

Related U.S. Application Data
[62] Division of Ser. No. 818,624, April 23, 1969.

[52] U.S. Cl.............. 73/359, 73/361, 136/227, 136/239
[51] Int. Cl.................. G01k 7/10, H01l 15/00
[58] Field of Search.............. 73/359, 361; 136/239, 227

[56] References Cited
UNITED STATES PATENTS

| | | | |
|---|---|---|---|
| 2,402,663 | 6/1946 | Ohl | 136/239 X |
| 3,342,646 | 9/1967 | Dingwall et al. | 136/205 |
| 3,460,996 | 8/1969 | Kudman | 136/239 X |
| 3,072,733 | 1/1963 | Sasaki et al. | 136/239 |
| 3,338,753 | 8/1967 | Horsting | 136/239 X |

Primary Examiner—Richard C. Queisser
Assistant Examiner—Frederick Shoon
Attorney—Edgar J. Brower, Thomas O. Watson, Jr. et al.

[57] ABSTRACT

To measure temperature in an electromagnetic field a thermocouple is connected to a meter. The temperature to be measured is sensed and converted into a D.C. voltage by the thermocouple. This D.C. voltage causes the meter to indicate the temperature. To prevent error due to electromagnetically coupled energy heating the thermocouple and/or producing a high frequency current which is conducted to the meter circuit from interfering with the meter readings, a physically small thermocouple with semiconductor leads or a semiconductor thermocouple having semiconductor leads is provided.

2 Claims, 2 Drawing Figures

3,748,904

SEMICONDUCTOR ELECTROMAGNETIC RADIATION ISOLATED THERMOCOUPLE

CROSS-REFERENCE TO RELATED APPLICATION

This application is a division of application Ser. No. 818,624 filed Apr. 23, 1969.

GOVERNMENT INTEREST IN THE INVENTION

The invention described herein may be manufactured and used by or for the Government of the United States of America for governmental purposes without the payment of any royalties thereon or therefor.

BACKGROUND OF THE INVENTION

1. Field of the Invention

This invention relates to thermocouples and, more particularly, to thermocouples usable in measuring the intensity of an electromagnetic field.

2. Description of the Prior Art

In the prior art it was known to use a thermocouple to measure the temperature of an energy absorbing member which is heated by an electromagnetic field and to use the output of the thermocouple to indicate the intensity of the field. See, for example, the U.S. Pat. Nos. 3,234,463 to Lederman et al.; 3,316,494 to Harrison et al. and 3,360,725 to Zucker. The present invention contemplates interposing a small resistor in a line carrying a current caused by an electromagnetic field. A thermocouple is then used to sense the temperature of the resistance and provide an output which indicates the intensity of the electromagnetic field. However, Applicant's invention is not limited to measuring the intensity of an electromagnetic field, but can be used to measure any heat which happens to be within an electromagnetic field. When it is attempted to measure heat in an electromagnetic field, problems result because electromagnetic coupling to the thermocouple and measuring circuits causes error in the measurement. This error comes about in three ways. First, the coupled electromagnetic energy dissipates power in the thermocouple itself thereby causing it to heat more than it would if it were only sensing the heat from the resistor. Second, the electromagnetic energy causes currents in the measuring circuit which, along with the electromagnetic field, can run up the wires from the thermocouple to the indicating instrument and interfere with an accurate reading. Third, if the instrumentation is in an electromagnetic field, electromagnetic currents induced in the measuring circuit can run down to the thermocouple causing additional unwanted thermocouple heating.

SUMMARY OF THE INVENTION

Applicant overcomes the above-mentioned problems by providing either a semiconductor thermocouple or a physically small thermocouple made of conducting materials having lengths of the leads to the measuring circuit made out of semiconductor material.

An object of the present invention is the provision of a thermocouple system for measuring the intensity of an electromagnetic field in which the electromagnetic coupling effects have a minimum of interference with the accuracy of the indication.

Another object of the present invention is to provide a thermocouple which is minimally affected by an electromagnetic environment.

Other objects, advantages and novel features of the present invention will become apparent from the following detailed description of the invention when considered in conjunction with the accompanying drawings.

DESCRIPTION OF THE PREFERRED EMBODIMENTS

Figure 1:
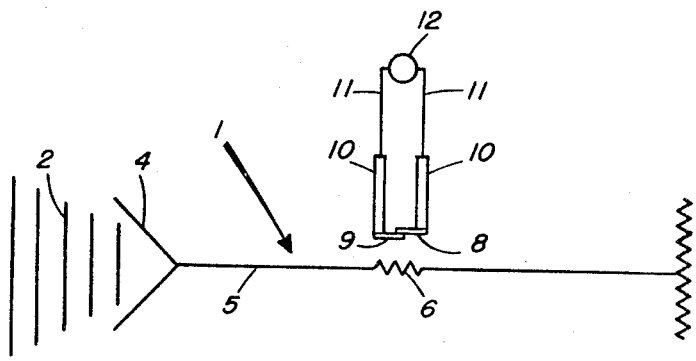
FIG. 1 shows schematically the application of Applicant's thermocouple in a system designed to measure the intensity of an electromagnetic field.

FIG. 1 shows an environment in which Applicant's thermocouple can be used wherein an electromagnetic field measuring system is generally designated by reference numeral 1. The system includes a receiver 4 for receiving electromagnetic radiation 2 and a wire 5 which carries a current in response to the electromagnetic radiation. Interposed in wire 5 is a resistor 6 which is heated by the current in wire 5 to an extent determined by the intensity of electromagnetic field 2. Adjacent resistor 6 is placed a thermocouple comprising overlapping elements 8 and 9. Connecting the thermocouple to a measuring circuit are semiconductor leads 10 which connect the thermocouple to meter 12 through wires 11. Meter 12 will be activated by the D.C. voltage output of the thermocouple to give an indication of the intensity of the electromagnetic field 2. The lengths of semiconductor leads 10 should (1) under normal circumstances be immediately adjacent to the thermocouple terminals; (2) be of significantly higher resistance than the thermocouple itself; and (3) be physically long enough and separated from one another enough to preclude appreciable coupling of electromagnetic energy between or across them.

Normally with an arrangement such as that shown in FIG. 1, there would be electromagnetic coupling between the wire 5 and resistor 6 and the thermocouple and measuring circuit. First, as previously described, this coupling would dissipate energy in the thermocouple which would heat the thermocouple to an extent greater than that caused by heat from resistor 6. Second, also as previously described, the coupled electromagnetic energy would induce currents in the measuring circuit which can interfere with the meter's indication. Third, if the meter 12 or wires 11 are in an electromagnetic field, electromagnetic energy may couple in to these items and be transferred to the thermocouple causing additional error.

To minimize these problems Applicant provides semiconductor leads for the thermocouple. The semiconductor leads 10, because of their poor conducting qualities, make it extremely difficult for electromagnetically induced currents to travel from the thermocouple to the meter to interfere with the output of the meter. Furthermore, if the electromagnetic field were coupled into wires 11, semiconductor leads 10 would make it difficult for the induced current to travel to the thermocouple to induce excess heating.

Applicant's thermocouple can be made of known conducting materials such as bismuth and antimony or can be made of known semiconductor material. Particularly when Applicant's thermocouple is made from conducting materials, the thermocouple is made very small in size to minimize the first-mentioned problem, i.e., excess heating of the thermocouple by electromagnetic energy dissipation therein. This enables the thermocouple to measure electromagnetic radiation of very high frequency without being heated by electromagnetic coupling effects. This is because the higher frequencies of electromagnetic energy tend to couple more easily across gaps of nonconducting material, i.e., air, space. If a physically large thermocouple is placed in a high frequency field, it will tend to act as a good receiver and thus generally will allow more coupling of electromagnetic energy. However, if a very small thermocouple is used it normally will act as a poor receiver of electromagnetic energy. The exact amount of coupling to the thermocouple will, of course, depend on the size of the thermocouple relative to the frequency and the intensity of the electromagnetic radiation. However, generally the smaller the thermocouple, the higher the frequency of the radiation measurable without an excessive amount of heating due to coupled electromagnetic energy.

The amount of current and therefore heat induced in the thermocouple will also generally be reduced by increasing the bulk resistance of the thermocouple materials. Therefore, Applicant contemplates, as one embodiment, the use of a semiconductor thermocouple to further minimize the first-mentioned problem of heating of the thermocouple by electromagnetic energy dissipated therein. IF the thermocouple is made of semiconductor material, the heating caused by coupling effects is further minimized because the very high resistance of the semiconductor thermocouple inhibits the induction of current in the thermocouple.

Figure 2:
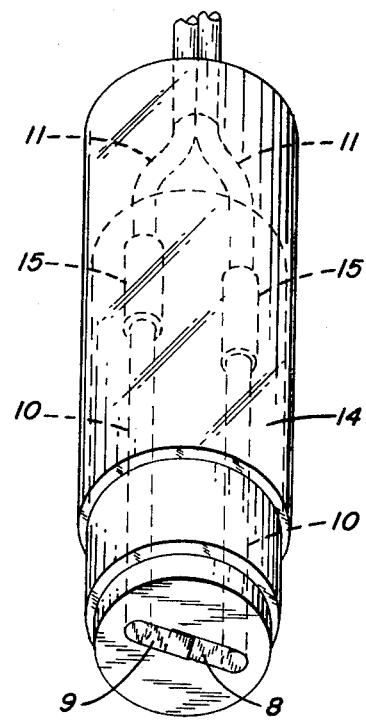
FIG. 2 shows the details of Applicant's thermocouple.

FIG. 2 shows more specifically the general construction of Applicant's thermocouple. The semiconductor leads are supported by and mounted in a plug 14 of some material, for example, a polyester resin. This material also serves to insulate the leads from one another. The two semiconductor leads 10 can be fastened to wires 11 with connector sleeves 15 which can connect the thermocouple into a circuit in which it is desired to be used. On the bottom face of plug 14 is provided a thermocouple having overlapping elements 8 and 9. As was previously stated, these elements can be known conducting materials such as bismuth and antimony or could be known semiconductor materials.

Although a convenient mode of manufacture, it is not necessary that plug 14 be provided, as the thermocouple could even conceivably be vapor deposited on the heat source itself. The only thing that is necessary is that a thermocouple, conductor or semiconductor, be provided with semiconductor leads. This arrangement has application in many circuits and in no way is its use contemplated as being limited to circuits for measuring electromagnetic radiation. Whenever it is necessary to use a thermocouple and/or it associated instrumentation in an electromagnetic field, Applicant's thermocouple can be used to advantage.

Obviously many modifications and variations of the present invention are possible in the light of the above teachings.

What is claimed is:

1. Apparatus for measuring heat in an RF field and reducing interference caused by said RF field comprising:
   a thermocouple made from semiconductor materials;
   means for indicating the output of said thermocouple; and
   semiconductor leads interconnecting said thermocouple and said indicating means; whereby said semiconductor materials forming the thermocouple and leads reduce the coupling and heating caused by said RF field.

2. The method of measuring heat in an RD field and reducing interference caused by said RF field comprising:
   placing a thermocouple made of semiconductor materials in a heat measuring position in the RF field; and
   connecting said thermocouple to an output indicating circuit with semiconductor leads; whereby said semi-conductor materials forming the thermocouple and leads reduce the coupling and heating caused by said RF field.

* * * * *